(No Model.)
F. P. HOKE.
CORN ROASTER.
No. 336,237. Patented Feb. 16, 1886.
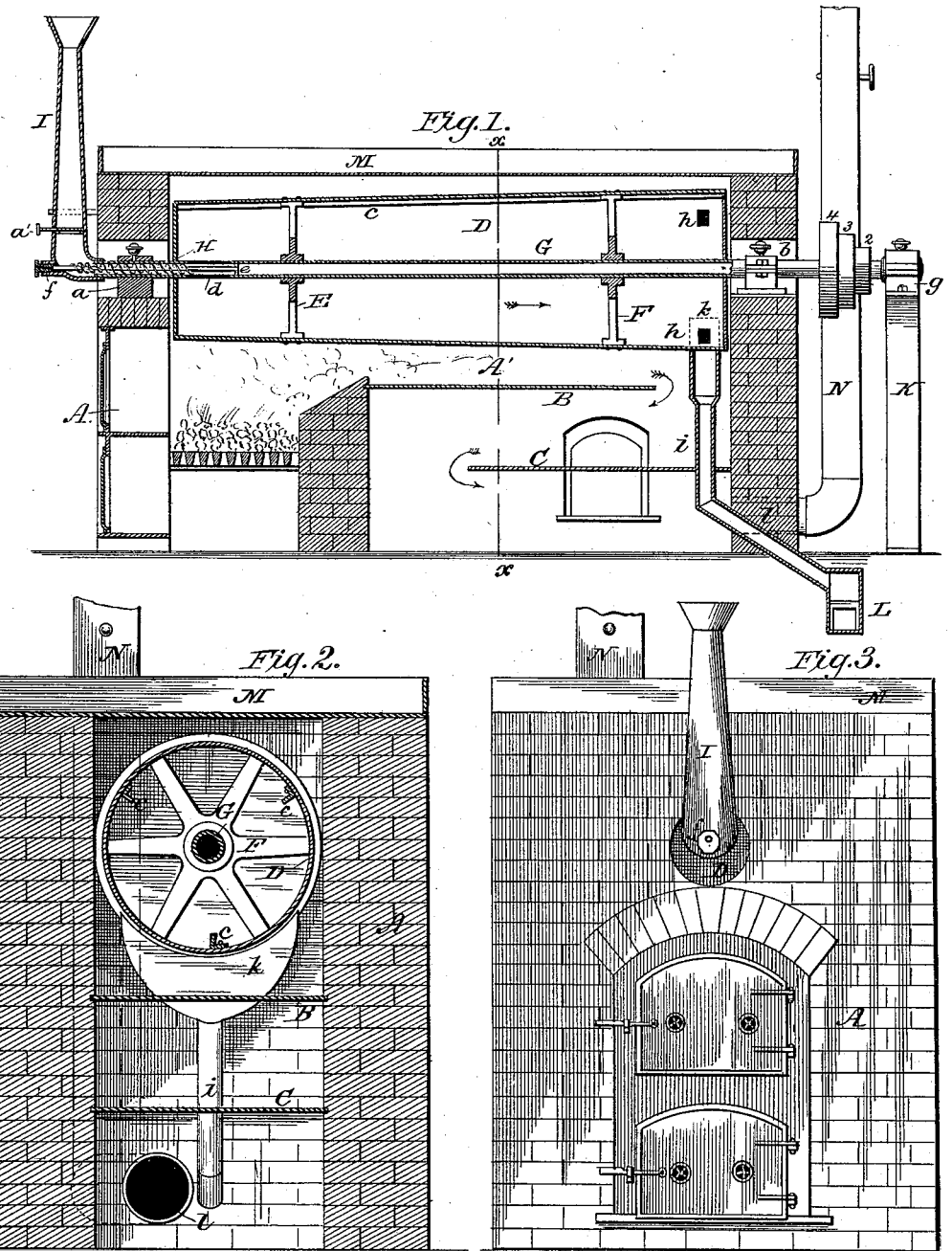
WITNESSES:
Fred G. Dieterich
Wm. E. Dyre
INVENTOR
Frank P. Hoke
By Johnston, Reinohl & Dyre
ATTORNEYS

UNITED STATES PATENT OFFICE.

FRANK P. HOKE, OF AVON, PENNSYLVANIA.

CORN-ROASTER.

SPECIFICATION forming part of Letters Patent No. 336,237, dated February 16, 1886.

Application filed December 22, 1885. Serial No. 186,473. (No model.)

*To all whom it may concern:*

Be it known that I, FRANK P. HOKE, a citizen of the United States, residing at Avon, in the county of Lebanon and State of Pennsylvania, have invented certain new and useful Improvements in Corn-Roasters; and I do hereby declare the following to be a full, clear, and exact description of the invention, such as will enable others skilled in the art to which it appertains to make and use the same.

The invention relates to a corn-roaster, and has for its object the construction of a device for use in connection with flouring-mills. Consumers of cornmeal are well aware of the loss attending the use of meal made from new corn that has not been thoroughly dried, which is due to the fact that such meal molds very rapidly, and in its use in frying the same the damp or moist meal when put into a pan containing hot lard causes a spirting, similar to that produced by dropping water into hot lard, which scatters the lard over the stove and floor, and frequently results in scalding or burning the cook engaged in the work of frying the meal.

By my invention green corn can be taken directly from the stalk, dried and roasted, or corn harvested in the usual season may be treated in the same manner and the objections enumerated overcome, and at the same time by roasting the corn a rich golden color and a delicious flavor is imparted to the meal, which renders it more palatable and salable.

The invention will be hereinafter fully described, and particularly pointed out in the claims.

In the accompanying drawings, which form a part of this specification, Figure 1 represents a longitudinal section; Fig. 2, a transverse section on the line *x x*, looking toward the rear of the roaster; Fig. 3, a front elevation, and Fig. 4 an enlarged detail, of the feeding device.

Reference being had to the drawings and the letters of reference marked thereon, A represents a furnace of usual construction built of masonry, and provided with the usual appurtenances, such as combustion-chamber A', grate-bars, fire and ash doors, smoke-stack, &c.

B C are baffle-plates supported by the masonry, and cause the products of combustion to traverse the roasting-drum D throughout its entire length before they escape to the atmosphere through the smoke-stack. The drum D is tapering in form, as shown in Fig. 1, to cause the corn to gravitate toward the discharge end of the drum while it is being revolved, and is constructed of thin rolled iron about three-sixteenths ($\frac{3}{16}$) of an inch in thickness.

E F are spiders for retaining the contour of the drum against the warping effect of the heat of the furnace.

G is a hollow shaft about four (4) inches in diameter, which passes through the drum D and the hubs of its spiders, and is supported in journal-boxes *a b*, resting upon the masonry.

*c* represents a series of projecting angle-irons secured to the inner surface of the drum D, and extending throughout its entire length, for the purpose of preventing the corn from slipping around the surface of the chamber as it is revolved. By interposing the angle-irons as the chamber is revolved slowly the corn striking the projections causes it to turn over, thus producing a thorough roasting of the corn on both sides, which greatly reduces the time required for doing the work.

The corn is supplied to the roasting-drum through one end of the hollow shaft G, which is slotted, as shown at *d* in Fig. 4, and is provided with a screw feeding device, H, one end of which is secured in a bridge or partition, *e*, in the shaft and revolves therewith, and the other end is journaled in a removable cap, *f*, which enters the boss formed on the feed-pipe I, which fits over the end of the shaft G, and is provided with a cut-off valve, *a'*. The extreme opposite end of the shaft is supported in a journal-box, *g*, on a suitable frame, K. Between the journal-boxes *b* and *g* the shaft G is provided with graduated pulleys 2 3 4, which are adapted to be connected by a belt (not shown) with the motor driving the machinery of the mill and vary the speed of the roaster as circumstances may require. The corn is discharged from the drum D through a series of openings, *h*, into a pipe, *i*, which is provided with an enlarged mouth, *k*, which fits around the outer circumference of the large end of the roasting-drum and conducts the roasted corn to the elevator-casing L, by which it is carried to any desired point in the mill.

The masonry forming the furnace A and the combustion-chamber A' is surmounted by a pan, M, which closes the upper part of the combustion-chamber. This pan is used for drying corn preparatory to the roasting process, and is of special advantage when green corn cut from the stalk is to be worked into meal; but it is used in all cases where the corn is not thoroughly dry, which condition exists only in what is known in the market as "old corn," which means of the preceding year's harvesting, and has lost its sweetness by age, and is therefore unsuitable alone for the purpose.

By placing the drying-pan over the top of the combustion-chamber the heat generated in the furnace is thoroughly utilized and fuel economized in operating the apparatus.

The discharge-flue $l$, for the smoke leading from the combustion-chamber to the stack N, is arranged in the lower part of the chamber, and passes through the masonry at an angle to enable the stack to be placed at one side of the longitudinal center of the structure, to be out of the way of the shaft and its driving-pulleys.

The several parts being constructed substantially as described, the operation is as follows: Fire having been started in the furnace A, the roaster is put in motion by connecting it with the mill-engine. Corn is then fed into the pipe I and gravitates to the lower end thereof, where it is brought in contact with the screw-feeding device, which is revolved by the shaft G, and carries it into said shaft, from which it is discharged into the drum D through the slot $d$, the supply being regulated by the cut-off $a'$ in the feed-pipe I, and after having been sufficiently roasted it is discharged into the pipe $i$, by which it is conducted to the elevator.

Experience will readily instruct the operator how long to subject the corn to the roasting operation to render it in proper condition for converting it into meal.

Having thus fully described my invention, what claim is—

1. A corn-roaster consisting of a tapering drum having a series of radial projections on its inner surface extending throughout its length, and a series of openings in the circumference of the large end, in combination with a hollow shaft passing through the drum, supporting a series of spiders and carrying a screw feeding device attached to a partition in the shaft, and supported at its free end in a removable cap, a series of openings in the shaft through which the grain is fed into the drum, and a discharge-pipe having an enlarged mouth fitting around the outer circumference of the drum, substantially as described.

2. A corn-roaster consisting of a furnace formed of masonry and provided with a combustion-chamber extending throughout its length and width, and a revolving drum suspended therein, in combination with a drying-pan supported by the masonry and exposed directly to the heat of the combustion-chamber, substantially as described.

In testimony whereof I affix my signature in presence of two witnesses.

FRANK P. HOKE.

Witnesses:
   J. G. ADAMS,
   S. H. BENTZ.